(12) United States Patent
Servais et al.

(10) Patent No.: US 10,989,522 B2
(45) Date of Patent: Apr. 27, 2021

(54) GLASS PRODUCT STRESS EVALUATION SYSTEM AND METHOD

(71) Applicant: Robex, LLC, Perrysburg, OH (US)

(72) Inventors: James Raymond Servais, Maumee, OH (US); Michael K. Holmes, Farmington, PA (US); Aaron J. Peper, Bowling Green, OH (US)

(*) Notice: Subject to any disclaimer, the term of this patent is extended or adjusted under 35 U.S.C. 154(b) by 0 days.

(21) Appl. No.: 16/814,012

(22) Filed: Mar. 10, 2020

(65) Prior Publication Data
US 2020/0292301 A1   Sep. 17, 2020

Related U.S. Application Data

(60) Provisional application No. 62/816,430, filed on Mar. 11, 2019.

(51) Int. Cl.
| | |
|---|---|
| G01B 11/16 | (2006.01) |
| G01N 21/88 | (2006.01) |
| G01N 21/90 | (2006.01) |
| C03B 25/00 | (2006.01) |

(52) U.S. Cl.
CPC ....... *G01B 11/161* (2013.01); *G01N 21/8806* (2013.01); *G01N 21/90* (2013.01); *C03B 25/00* (2013.01); *G01N 2021/8848* (2013.01)

(58) Field of Classification Search
CPC .. G01B 11/161; G01N 21/8806; G01N 21/90; G01N 2021/8848; C03B 25/00
USPC .................................................. 356/32, 33
See application file for complete search history.

(56) References Cited

U.S. PATENT DOCUMENTS

| | | | | |
|---|---|---|---|---|
| 3,963,348 A | * | 6/1976 | Nakatani | G01B 11/168 356/33 |
| 4,547,067 A | * | 10/1985 | Watanabe | G01N 21/9018 250/223 B |
| 4,908,507 A | * | 3/1990 | Imre | G01N 21/90 250/223 B |
| 5,305,081 A | * | 4/1994 | Gooch | G01L 1/24 250/223 B |
| 6,067,155 A | * | 5/2000 | Ringlien | G01N 21/21 356/240.1 |
| 7,057,718 B2 | * | 6/2006 | Kwirandt | G01N 21/9027 250/223 B |

(Continued)

*Primary Examiner* — Roy M Punnoose
(74) *Attorney, Agent, or Firm* — Charles F. Charpie, III; Eastman & Smith Ltd.

(57) ABSTRACT

A glass product stress evaluation system is provided. The glass product stress evaluation system includes a background light source to selectively transmit light of different wavelengths and illuminates a glass product. An imaging device is mounted in proximity to the glass product and develops digitally encoded representations of internal annealing stresses formed within the glass product. The imaging device converts the digitally encoded internal stress representations into digital signals. A plurality of optical devices provides a converging view of the glass product. A plurality of filters is mounted in proximity to the plurality of optical devices and selectively transmits light of different wavelengths to the optical devices, thereby transforming detected imaged stresses in the glass product into visible colors. A processing unit receives the digital images from the imaging device and converts the digital images into visible images. The digital images can be classified into annealing grades.

20 Claims, 3 Drawing Sheets

(56) References Cited

U.S. PATENT DOCUMENTS

| | | | |
|---|---|---|---|
| 10,012,598 B2 * | 7/2018 | Huibregtse | G01N 21/9054 |
| 10,883,943 B2 * | 1/2021 | Veillon | G01N 21/8806 |
| 2005/0037615 A1 * | 2/2005 | Cabib | G01N 21/9501 |
| | | | 438/689 |

* cited by examiner

| Annealing Grade | Typical Digital Image | Description |
|---|---|---|
| T1 |  | Very good annealing. |
| T2 |  | Acceptable annealing. |
| T3 |  | Check zone temperatures against set point. |
| T4 |  | Contain annealing issue. |
| T5 |  | Contain annealing issue. |

GLASS PRODUCT STRESS EVALUATION SYSTEM AND METHOD

RELATED APPLICATIONS

This application claims the benefit of pending U.S. Provisional Patent Application No. 62/816430, filed Mar. 11, 2019, the disclosure of which is incorporated herein by reference.

BACKGROUND

In the production of glass products, such as for example, containers, bottles, jars and the like, molten glass in the form of gobs is fed to forming sections where the glass products are shaped.

The glass products formed by the forming sections, while still hot, are deposited on a conveyor, which move the glass products away from the forming sections. The glass products are then deposited on a conveyor of an annealing lehr, wherein they are exposed to a tempering process, which addresses the residual stresses accumulated in the glass due to fast cooling during the forming process.

As the glass products exit the annealing lehr, they can be sprayed with lubricants configured to help prevent downstream breakage as the glass products come into contact with each other.

In the event the annealing process has not adequately addressed the residual stresses accumulated in the glass product, the glass product can be unusable or even prone to breakage.

It would be advantageous if the residual stresses in the glass product could be effectively evaluated.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the glass product stress evaluation system and method.

The above objects as well as other objects not specifically enumerated are achieved by a glass product stress evaluation system. The glass product stress evaluation system includes a background light source configured to selectively transmit light of different wavelengths. The background light source is further configured to illuminate a glass product. An imaging device is mounted in proximity to the glass product and is configured to develop digitally encoded representations of internal annealing stresses formed within the glass product. The imaging device is further configured to convert the digitally encoded internal stress representations into digital signals. A plurality of optical devices is positioned between the glass product and the imaging device and is configured to provide a converging view of the glass product. A plurality of filters is mounted in proximity to the plurality of optical devices and is configured to selectively transmit light of different wavelengths to the optical devices, thereby transforming detected imaged stresses in the glass product into visible colors. A processing unit is configured to receive the digital images from the imaging device and is further configured to convert the digital images into visible images. The digital images can be classified into annealing grades.

The above objects as well as other objects not specifically enumerated are also achieved by a method of using a glass product stress evaluation system. The glass product stress evaluation system includes the steps of selectively transmitting light of different wavelengths thereby illuminating a glass product, positioning a plurality of optical devices proximate the glass product and configuring the plurality of optical devices to provide a converging view of the glass product, positioning a plurality of filters between the glass product and the plurality of optical devices, the plurality of filters configured to transform detected stresses in the glass product into visible colors, positioning an imaging device proximate the filters and developing digitally encoded representations of internal annealing stresses formed within the glass product, converting the digitally encoded internal stress representations into digital signals, receiving the digital signals into a processing unit and converting the digital images into visible images, wherein the digital images can be classified into annealing grades.

Various objects and advantages of the glass product stress evaluation system and method will become apparent to those skilled in the art from the following detailed description, when read in light of the accompanying drawings.

DETAILED DESCRIPTION

The glass product stress evaluation system and method (hereafter "evaluation system") will now be described with occasional reference to specific embodiments. The evaluation system may, however, be embodied in different forms and should not be construed as limited to the embodiments set forth herein. Rather, these embodiments are provided so that this disclosure will be thorough and complete, and will fully convey the scope of the evaluation system to those skilled in the art.

Unless otherwise defined, all technical and scientific terms used herein have the same meaning as commonly understood by one of ordinary skill in the art to which the evaluation system belongs. The terminology used in the description of the evaluation system herein is for describing particular embodiments only and is not intended to be limiting of the evaluation system. As used in the description of the evaluation system and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the evaluation system. Notwithstanding that the numerical ranges and parameters setting forth the broad scope of the evaluation system are approximations, the numerical values set forth in the specific examples are reported as precisely as possible. Any numerical values, however, inherently contain certain errors necessarily resulting from error found in their respective measurements.

In accordance with the illustrated embodiments, an evaluation system for use with glass products is provided. Generally, the evaluation system is configured to evaluate the residual internal stresses that may be present in a glass product before, during and after an annealing process. The evaluation of the residual stresses is a result of digital images produced and analyzed by the evaluation system.

Figure 1:
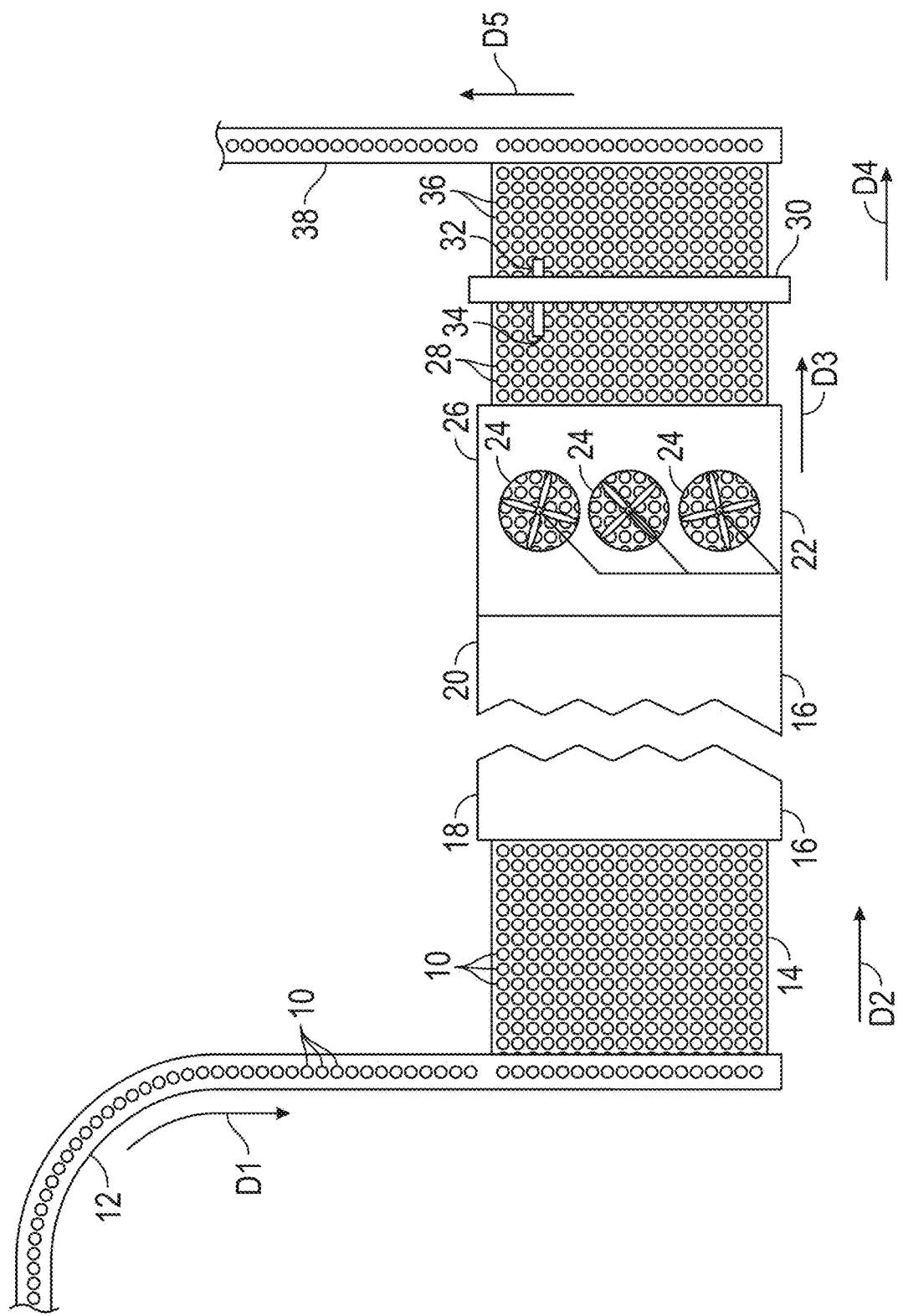
FIG. 1 is a plan view of a conventional annealing lehr cooling system for glass products.

Referring now to the drawings, there is illustrated in FIG. 1 a schematic illustration of a portion of a system for forming glass product. The system is conventional in the art and will only be briefly described herein. It should be appreciated that the glass product can have different forms, such as the non-limiting examples of containers, bottles, jars and the like. Following a forming process, the still-hot glass products 10 are conveyed in a downstream direction, as indicated by direction arrow D1, by a conveyor system 12 and deposited onto an annealing lehr conveyor system 14. The conveyor systems 12, 14 are conventional in the art and will not be described herein. As the still-hot glass products 10 are deposited on the annealing lehr conveyor system 14, the still-hot glass products 10 are formed into rows and columns. Any suitable configuration of rows and columns can be used.

Referring again to FIG. 1, the still-hot glass products 10 are advanced by the annealing lehr conveyor system 14 into the annealing lehr 16, as indicated by direction arrow D2. As is conventional in the art, the annealing lehr 16 is a temperature-controlled kiln configured for annealing the still-hot glass product 10. In the illustrated embodiment, the annealing lehr 16 has the form of a long kiln within which a decreasing-temperature gradient is formed from a first end 18 to a second end 20, and through which the glass products 10 are transported by the annealing lehr conveyor system 14. However, in other embodiments, the annealing lehr 16 can have other structures and forms and can operate in different manners.

Referring again to FIG. 1, a fan bank 22 is located proximate the second end 20 of the annealing lehr 16. The fan bank 22 includes a plurality of cooling fans 24, configured to generate and direct flows of cooling air over the glass product 10 as the glass product 10 exits the second end 20 of the annealing lehr 16, as indicated by direction arrow D3. As the glass product 10 leaves the fan bank 22 at a fan bank exit 26, the glass product 10 has been cooled by the plurality of fans 24 to temperatures generally less than 300° F., thereby forming cooled glass product 28.

Referring again to FIG. 1, a lubrication system 30 can be positioned in a downstream direction from the fan bank exit 26 and includes a plurality of lubricant spray heads 32 (a lone lubricant spray head 32 is shown for purposes of clarity). The plurality of lubricant spray heads 32 is configured to apply a film of lubricant 34 to an outer surface of the cooled glass products 28 as the cooled glass products 28 are advanced by the annealing lehr conveyor system 14, as indicated by direction arrow D4. As is known in the art, the lubricant can be specific to the type and nature of the cooled glass product 28. The lubrication system 30 can employ any desired quantity of lubricant spray heads 32. As the cooled glass product 28 is sprayed with the lubricant, lubricated glass product 36 is formed. Typically, the lubricated glass product 36 is advanced to further downstream operations (not shown) by a conveyor system 38, as shown by direction arrow D5.

In certain instances, it may be desirable to evaluate the internal stresses that may develop in a glass product before, during and after the annealing process. These instances may occur at different production locations along the system for forming glass product, as described in FIG. 1. As one non-limiting example, in certain instances it may be desirable to evaluate the internal stresses that may exist in the cooled glass product 28 as the cooled glass product 28 exits the fan bank exit 26. Knowledge of the internal stresses of the cooled glass product 28 can provide data leading to cooling and/or annealing adjustments provided by the plurality of fans 24. However, it should be appreciated that in other instances, it may be desirable to evaluate the internal stresses that may exist in the glass product at other production locations.

Figure 2:
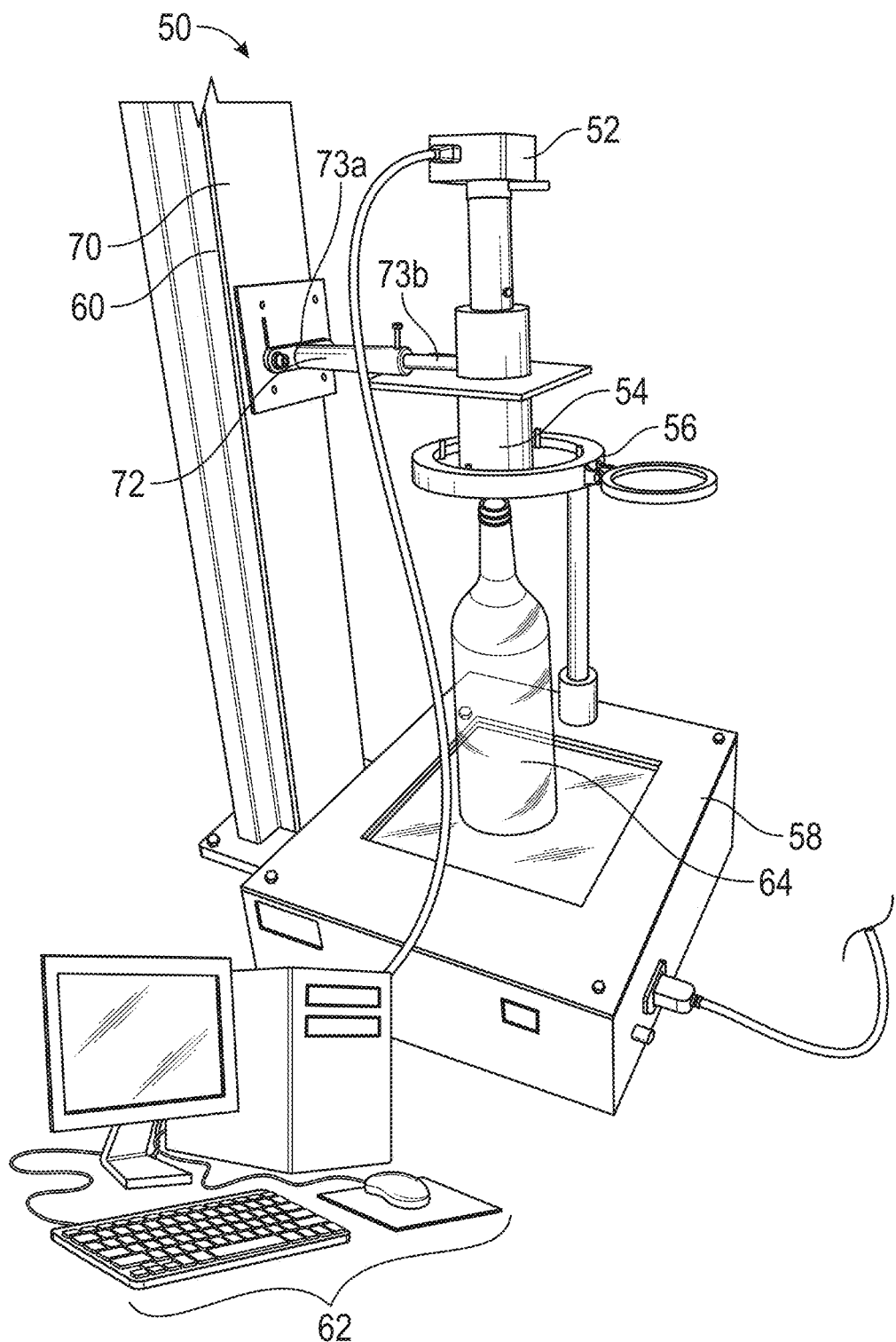
FIG. 2 is a perspective view of a glass product stress system.

Referring now to FIG. 2, an evaluation system is shown at 50. Generally, the evaluation system 50 is configured to produce digital images indicating the internal stresses that may exist in a glass product. The digital images can be analyzed and rated in terms of annealing grades. In the event the stresses and/or resulting annealing grades are undesirable, the annealing processes can be adjusted to adjust the internal stresses within the glass product.

Referring again to FIG. 2, the evaluation system 50 includes an imaging device 52, a plurality of transmissive optical devices 54, a plurality of filters 56, a background light source 58, a mounting framework 60 and a processing unit 62.

Referring again to FIG. 2, the imaging device 52 is configured to develop digitally encoded representations of the internal stresses formed within a glass product 64. The imaging device 52 is further configured to convert the digitally encoded internal stress representations into digital signals that can be processed by the processing unit 62. In the illustrated embodiment, the imaging device 52 is a digital optical inspection tool, such as the non-limiting example of model BOA 640C INS, manufactured and marketed by Teledyne DALSA, headquartered in Waterloo, ON, Canada. However, in alternate embodiments, the imaging device 52 can be other mechanisms or devices, and can have other forms sufficient to develop digitally encoded representations of the internal stresses formed within a glass product 64 and convert the digitally encoded internal stress representations into digital signals that can be processed by the processing unit 62.

Referring again to FIG. 2, the plurality of optical devices 54 are configured to provide a converging view of the glass product 64, focusing on the interior portions and the surrounding sides simultaneously. Advantageously, the plurality of optical devices 54 are used to eliminate the need for multiple camera and imaging lens setups in the inspection of the glass product 64. In the illustrated embodiment, the plurality of optical devices 54 include one or more hypercentric lens, such as the non-limiting example the Hypercentric Lens, model number #HE-5012, manufactured and marketed by Light Works, LLC, headquartered in Toledo, Ohio. In alternate embodiments, the plurality of optical devices 54 can be other mechanisms or devices and can have other forms sufficient to provide a converging view of the glass product 64, focusing on the interior portions and the surrounding sides simultaneously.

Referring again to FIG. 2, the plurality of filters 56 and the background light source 58, taken together, are configured for several functions. First, the combination of the plurality of filters 56 and the background light source 58 is configured to selectively transmit light of different wavelengths, thereby transforming the detected imaged stresses in the glass product 64 into visible colors. Second, the combination of the plurality of filters 56 and the background light source 58 is configured to illuminate the glass product 64 with a white light sufficient for the imaging device 52 to develop a digitally encoded representation of the stresses formed within the glass product 64. The background light source 58 is further configured to provide separation between the glass product 64 and the background. In the illustrated embodiment, the plurality of filters 56 includes a linear polarizer, a quarter wave retarder plate. One non-limiting example of a suitable combination of a plurality of filters 56 and the background light source 58 is the Polarimeter System, model number PS-100-C148, manufactured and marketed by StrainOptics, headquartered in New Wales, Pa. In the alternative, other suitable filters, background light sources and combinations thereof can be used sufficient for the functions described herein.

Referring again to FIG. 2, it is within the contemplation of the evaluation system 50 that in certain instances the plurality of filters 56 can have dyed or interference coatings sufficient to control the wavelength and type of light that is transmitted through the filter, absorbed by the filter and/or reflected off of the filter.

Referring again to FIG. 2, the mounting framework 60 is configured to vary a height of the imaging device 52, the plurality of optical devices 54 and the plurality of filters 56 above the glass product 64. The mounting framework 60 includes a substantially vertical column 70 and an attached arm 72. The vertical column 70 supports the arm 72 for axial movement along the vertical column 70. The arm 72 is formed from a plurality of arm members 73a, 73b connected to the imaging device 52, plurality of optical devices 54 and the plurality of filters 56 in a telescoping manner that proper location of the imaging device 52, plurality of optical devices 54 and the plurality of filters 56 relative to the glass product 64. In the illustrated embodiment, the vertical column 70 is formed from a metallic, structural beam. However, in other embodiments, the vertical column 70 can be formed from other structures or combinations of structures sufficient to support the arm 72 for axial movement along the vertical column 70. In the illustrated embodiment, the arm members 73a, 73b are formed from metallic channels. However, in alternate embodiments, the arm members 73a, 73b can be formed from other structures and materials sufficient to operate in a telescoping manner to proper locate the imaging device 52, plurality of optical devices 54 and the plurality of filters 56 relative to the glass product 64.

Figure 3:
FIG. 3 is a schematic view of annealing grades and color stress images of evaluated glass product.
Figure 3:
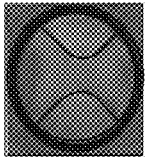
Figure 3:
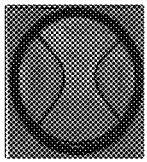
Figure 3:
Figure 3:

Referring again to FIG. 2, the processing unit 62 is configured to receive the digital images from the imaging device 52 and is further configured to convert the digital images into visible images as shown in FIG. 3. In the illustrated embodiment, the processing unit 62 is a computer equipped with image processing software. In alternate embodiment, the processing unit 62 can have other forms and can include other mechanism, devices and structures sufficient to receive the digital images from the imaging device 52 and convert the digital images into visible images.

The images of the stresses formed within the glass product 64 can be rated in terms of annealing grades 80, 82, 84, 86 and 88, as shown in FIG. 3. Annealing grade 80 is classified as a Grade T1 stress level, with the indicated digital image and a description of very good annealing. No adjustments to the annealing process are required for the Grade T1 stress level. Annealing grade 82 is classified as a Grade T2 stress level, with the indicated digital image and a description of acceptable annealing. No adjustments to the annealing process are required for the Grade T2 stress level. Annealing grade 84 is classified as a Grade T3 stress level, with the indicated digital image and a description of requiring a check of zone temperatures against a set point. Adjustments may be required to the annealing process are for the Grade T3 stress level. Annealing grade 86 is classified as a Grade T4 stress level, with the indicated digital image and a description of contains annealing issue. Adjustments to the annealing process are required for the Grade T4 stress level. Annealing grade 88 is classified as a Grade T5 stress level, with the indicated digital image and a description of contains annealing issue. Adjustments to the annealing process are required for the Grade T5 stress level. However, it should be appreciated that in other embodiments, other digital images, other annealing grades/scales and other descriptions can be used.

Referring now to FIGS. 1 and 2, it is further contemplated that the processing unit 62 can be configured to provide alerts in the event the digital images of the stresses indicate the stresses are outside of desired tolerances. It is still further contemplated that the processing unit 62 can be integrated into the conventional annealing lehr cooling system shown in FIG. 1 in a manner such as to automatically adjust production mechanisms and processes based on analysis of the digital images. Finally, it is contemplated that the glass product 64 can be removed from any point of the conventional annealing lehr cooling system by robotic structures, mechanisms and/or devices, thereby allowing the handling of glass product 64 having high temperatures for evaluation purposes.

The principle and mode of operation of the glass product stress evaluation system and method have been described in certain embodiments. However, it should be noted that the glass product stress evaluation system and method may be practiced otherwise than as specifically illustrated and described without departing from its scope.

What is claimed is:

1. A glass product stress evaluation system comprising:
   a background light source configured to selectively transmit light of different wavelengths, the background light source further configured to illuminate a glass product;
   an imaging device mounted in proximity to the glass product and configured to develop digitally encoded representations of internal annealing stresses formed within the glass product, the imaging device further configured to convert the digitally encoded internal stress representations into digital signals;
   a plurality of optical devices positioned between the glass product and the imaging device and configured to provide a converging view of the glass product;
   a plurality of filters mounted in proximity to the plurality of optical devices and configured to selectively transmit light of different wavelengths to the optical devices, thereby transforming detected imaged stresses in the glass product into visible colors; and
   a processing unit configured to receive the digital images from the imaging device and is further configured to convert the digital images into visible images;
   wherein the digital images can be classified into annealing grades.

2. The glass product stress evaluation system of claim 1, wherein the background light source provides separation between the glass product and a background.

3. The glass product stress evaluation system of claim 1, wherein the imaging device is a digital optical inspection device.

4. The glass product stress evaluation system of claim 1, wherein the imaging device is a model BOA 640C INS, marketed by Teledyne Dalsa.

5. The glass product stress evaluation system of claim 1, wherein the converging view of the plurality of optical devices simultaneously focuses on the interior portions and surrounding sides of the glass product.

6. The glass product stress evaluation system of claim 1, wherein the optical devices are configured to eliminate the need for multiple cameras and multiple imaging lens setups.

7. The glass product stress evaluation system of claim 1, wherein the plurality of optical devices includes a Hypercentric Lens model number #HE-5012, marketed by Light Works, LLC.

8. The glass product stress evaluation system of claim 1, wherein the plurality of filters is further configured to illuminate the glass product with white light.

9. The glass product stress evaluation system of claim 1, wherein the plurality of filters includes a linear polarizer and a quarter wave retarder plate.

10. The glass product stress evaluation system of claim 1, wherein the plurality of filters includes one or more interference coatings.

11. A method of using a glass product stress evaluation system comprising the steps of:
    selectively transmitting light of different wavelengths thereby illuminating a glass product;
    positioning a plurality of optical devices proximate the glass product and configuring the plurality of optical devices to provide a converging view of the glass product;
    positioning a plurality of filters between the glass product and the plurality of optical devices, the plurality of filters configured to transform detected stresses in the glass product into visible colors;
    positioning an imaging device proximate the filters and developing digitally encoded representations of internal annealing stresses formed within the glass product;
    converting the digitally encoded internal stress representations into digital signals;
    receiving the digital signals into a processing unit and converting the digital images into visible images;
    wherein the digital images can be classified into annealing grades.

12. The method of claim 11, including the step of providing separation between the glass product and a background where the background light source.

13. The method of claim 11, wherein the imaging device is a digital optical inspection device.

14. The method of claim 11, wherein the imaging device is a model BOA 640C INS, marketed by the Teledyne Dalsa.

15. The method of claim 11, including the step of simultaneously focusing on the interior portions and surrounding sides of the glass product with the converging view of the plurality of optical devices.

16. The method of claim 11, including the step of eliminating the need for multiple cameras and multiple imaging lens setups through the use of the optical devices.

17. The method of claim 11, wherein the plurality of optical devices includes a Hypercentric Lens model number #HE-5012, marketed by Light Works, LLC.

18. The method of claim 11, including the step of illuminate the glass product with white light with the plurality of filters.

19. The method of claim 11, wherein the plurality of filters includes a linear polarizer and a quarter wave retarder plate.

20. The method of claim 11, including the step of coating the plurality of filters with one or more interference coatings.

\* \* \* \* \*